United States Patent
Iwasaki (10) Patent No.: US 9,269,957 B2
(45) Date of Patent: Feb. 23, 2016

(54) LITHIUM ION BATTERY AND METHOD FOR PRODUCING THE SAME

(75) Inventor: Tomio Iwasaki, Tsukuba (JP)

(73) Assignee: Hitachi, Ltd., Tokyo (JP)

( * ) Notice: Subject to any disclaimer, the term of this patent is extended or adjusted under 35 U.S.C. 154(b) by 184 days.

(21) Appl. No.: 13/884,278

(22) PCT Filed: Nov. 18, 2010

(86) PCT No.: PCT/JP2010/006764
§ 371 (c)(1),
(2), (4) Date: May 9, 2013

(87) PCT Pub. No.: WO2012/066600
PCT Pub. Date: May 24, 2012

(65) Prior Publication Data
US 2013/0224592 A1   Aug. 29, 2013

(51) Int. Cl.
*H01M 4/62* (2006.01)
*C08F 114/22* (2006.01)
*H01M 4/13* (2010.01)
*H01M 4/139* (2010.01)
*H01M 10/0525* (2010.01)

(52) U.S. Cl.
CPC ............ *H01M 4/623* (2013.01); *C08F 114/22* (2013.01); *H01M 4/13* (2013.01); *H01M 4/139* (2013.01); *H01M 10/0525* (2013.01); *Y02E 60/122* (2013.01); *Y02P 70/54* (2015.11); *Y02T 10/7011* (2013.01)

(58) Field of Classification Search
CPC combination set(s) only.
See application file for complete search history.

(56) References Cited

U.S. PATENT DOCUMENTS

| | | | |
|---|---|---|---|
| 2002/0122950 A1 | 9/2002 | Ehrlich et al. | |
| 2004/0058240 A1 | 3/2004 | Christensen | |
| 2007/0190334 A1* | 8/2007 | Araki et al. | 428/421 |
| 2008/0081195 A1* | 4/2008 | Chung et al. | 428/421 |
| 2008/0233477 A1 | 9/2008 | Takahashi et al. | |
| 2008/0318108 A1* | 12/2008 | Kaneko et al. | 429/33 |

(Continued)

FOREIGN PATENT DOCUMENTS

| | | |
|---|---|---|
| JP | 7-228636 A | 8/1995 |
| JP | 10-298386 A | 11/1998 |

(Continued)

OTHER PUBLICATIONS

Li et al. "Synthesis of Telechelic Fluoropolymers with Well-Defined Functional End Groups for Cross-Linked Networks and Nanocomposites", Macromolecules, 2007, 40, 4121-4123.*

(Continued)

*Primary Examiner* — Nicole M Buie-Hatcher
(74) *Attorney, Agent, or Firm* — Crowell & Moring LLP (57) ABSTRACT

Provided is a lithium ion battery having a long service life by improving an adhesion strength between a binder resin and a metal foil. A binder resin, which is a compound having a chemical structure that contains a polyvinylidene fluoride molecular chain, a six-membered ring such as a cyclohexane ring, and an end group selected from the group consisting of $SiX_3$, SH, $NH_2$, $GeX_3$, and $TiX_3$ (wherein X is a functional group that undergoes a condensation reaction), wherein the six-membered ring is disposed in a region between the polyvinylidene fluoride molecular chain and the end group, is mixed with an active material and applied to a metal foil, and the binder resin is chemically bonded to metal atoms such as copper atoms on the surface of the metal foil.

8 Claims, 9 Drawing Sheets

(56) References Cited

U.S. PATENT DOCUMENTS

2010/0124661 A1 5/2010 Moorlag et al.
2011/0015359 A1* 1/2011 Hung et al. .................. 526/247

FOREIGN PATENT DOCUMENTS

| | | |
|---|---|---|
| JP | 2002-83588 A | 3/2002 |
| JP | 2002-246029 A | 8/2002 |
| JP | 2008-235090 A | 10/2008 |
| JP | 2009-224288 A | 10/2009 |
| JP | 2010-122680 A | 6/2010 |
| JP | 2010-122681 A | 6/2010 |
| WO | WO 02/073720 A2 | 9/2002 |
| WO | WO 2010/123269 A2 | 10/2010 |

OTHER PUBLICATIONS

International Search Report with English translation dated Dec. 21, 2010 (four (4) pages).
European Search Report dated Feb. 24, 2015 (Six (6) pages).

* cited by examiner

LITHIUM ION BATTERY AND METHOD FOR PRODUCING THE SAME

TECHNICAL FIELD

The present invention relates to a positive electrode and a negative electrode for a lithium ion battery, and also relates to a lithium ion battery using the same.

BACKGROUND ART

Recently, a high-power and high-energy density lithium ion battery has been demanded not only for consumer appliances such as cellular phones, but also as a power source for hybrid cars capable of efficiently utilizing energy.

With regard to a binder resin (adhesive) that bonds an electrode active material and a metal foil to each other in a lithium ion battery, polyvinylidene fluoride (PVDF) which is hardly degraded even if it is in contact with an electrolytic solution is described in Patent Literatures 1 and 2.

CITATION LIST

Patent Literature

PTL 1: JP-A-2009-224288
PTL 2: JP-A-2002-83588

SUMMARY OF INVENTION

Technical Problem

A lithium ion battery is lightweight and has high battery voltage and high energy density, and therefore is prospective as a battery for hybrid cars. However, when PVDF was used as a binder resin, the adhesiveness between an electrode active material and a metal foil was not sufficient, and for example, about 15-year or more service life of the battery could not be guaranteed.

An object of the invention is to improve the adhesiveness between a binder resin and a metal foil in a positive electrode and a negative electrode for a lithium secondary battery so as to prolong the service life of a lithium ion secondary battery.

Solution to Problem

The binder resin of the invention is a compound having a chemical structure that contains a polyvinylidene fluoride molecular chain, a six-membered ring containing carbon and hydrogen, and an end group selected from the group consisting of $SiX_3$, S, N, $GeX_3$, and $TiX_3$ (wherein X is a functional group that undergoes a condensation reaction), and is characterized in that the six-membered ring is disposed in a region between the polyvinylidene fluoride molecular chain and the end group.

Advantageous Effects of Invention

According to the invention, the adhesion strength between a binder resin and a metal foil (such as a metal foil) for an electrode can be increased, and therefore, a lithium ion battery having a long service life can be provided.

DESCRIPTION OF EMBODIMENTS

The present inventors made intensive studies to find a means for improving the adhesion strength between a binder resin and a metal foil in a lithium ion battery that contains an electrolytic solution and a positive electrode and a negative electrode, each containing an active material that absorbs and releases lithium, a binder resin, and a metal foil, and as a result, they found that the bonding of the binder resin and the metal foil through a chemical bond is effective. Further, they found that in this case, the attachment of a six-membered ring to the molecular backbone of the binder resin is effective.

In addition, they found that in order to further improve the adhesiveness, the use of an Al alloy containing Cu, Cr, or Ni as a cathode metal foil (a metal foil which is a constituent element of a positive electrode), and the use of a Cu alloy containing Si or Ni as an anode metal foil (a metal foil which is a constituent element of a negative electrode) are effective. Here, the Al alloy is an alloy containing Al as a main component, and the Cu alloy is an alloy containing Cu as a main component.

Hereinafter, a binder resin, a positive electrode, a negative electrode, a lithium ion battery using the same, and a method for producing the same according to an embodiment of the invention will be described.

The binder resin is a compound having a chemical structure that contains a polyvinylidene fluoride molecular chain, a six-membered ring containing carbon and hydrogen, and an end group selected from the group consisting of $SiX_3$, SH, $NH_2$, $GeX_3$, and $TiX_3$ (wherein X is a functional group that undergoes a condensation reaction), and the six-membered ring is disposed in a region between the polyvinylidene fluoride molecular chain and the end group.

The binder resin is represented by the following chemical formula (1).

[Chem. 1]

Chemical Formula (1)

In the formula, $Y^1$ and $Y^2$ may be the same or different and are each selected from the group consisting of $SiX_3$, SH, $NH_2$, $GeX_3$, and $TiX_3$ (wherein X is a functional group that undergoes a condensation reaction); $R^1$ and $R^4$ are each a linear alkyl group having 2 to 4 carbon atoms to which a fluorine atom may be attached; $R^2$ and $R^3$ are each a linking group that contains a six-membered ring containing carbon and hydrogen; and n is a positive integer.

Here, X is preferably a functional group selected from the group consisting of $OCH_3$, $OC_2H_5$, $OCOCH_3$, and Cl.

The six-membered ring constituting the binder resin is preferably a benzene ring or a cyclohexane ring.

It is preferred that $R^2$ and $R^3$ in the above chemical formula (1) each contain an acene ring.

Here, the acene ring is preferably a naphthalene ring, an anthracene ring, a tetra ring, or a pentacene ring.

The positive electrode and the negative electrode, each have a configuration in which a mixture containing the binder resin and an active material is applied to a metal foil, and have a structure in which the binder resin is chemically bonded to metal atoms on the surface of the metal foil.

The positive electrode and the negative electrode each have a configuration in which a mixture containing a binder resin and an active material is applied to a metal foil, and have a chemical structure represented by the following chemical formula (2) at an interface between the binder resin and the metal foil. Incidentally, the "active material" is a term representing a cathode active material or an anode active material Chemical Formula (2)

[Chem. 2]

In the formula, $Z^1$ and $Z^2$ may be the same or different and are each selected from the group consisting of $SiO_3$, S, N, $GeO_3$, and $TiO_3$; $R^1$ and $R^4$ are each a linear alkyl group having 2 to 4 carbon atoms to which a fluorine atom may be attached; $R^2$ and $R^3$ are each a linking group that contains a six-membered ring containing carbon and hydrogen; n is a positive integer; and Me is a metal atom.

Here, the metal foil is preferably contains Cu or Al as a main component.

Further, it is preferred that the metal foil is configured to contain Cu as a main component and also contain at least one of Si and Ni as an additive element, or is configured to contain Al as a main component and also contain at least one additive element selected from the group consisting of Cu, Cr, and Ni.

The lithium ion battery contains the positive electrode, the negative electrode, and a separator interposed between the positive electrode and the negative electrode.

A method for producing the lithium ion battery is a method for producing a lithium ion battery containing a positive electrode and a negative electrode, each having a configuration in which a mixture containing the binder resin and an active material is applied to a metal foil, and includes a step of producing the positive electrode and the negative electrode by applying the binder resin to the metal foil to cause a coupling reaction between the binder resin and metal atoms constituting the surface of the metal foil.

Here, the coupling reaction is preferably caused by a thermal treatment.

Further, the coupling reaction is preferably a silane coupling reaction or a thiol coupling reaction.

Incidentally, the following chemical formulae (3) to (10) show examples of the linking group that contains a six-membered ring.

Among these, the following chemical formula (3) is a general formula (wherein n is 0 or an integer of 1 or more) of an acene ring. Further, as the following chemical formulae (7) to (10), the linking group may be one in which a five-membered ring or a four-membered ring is attached.

[Chem. 3]

Chemical Formula (3)

[Chem. 4]

Chemical Formula (4)

[Chem. 5]

Chemical Formula (5)

[Chem. 6]

Chemical Formula (6)

[Chem. 7]

Chemical Formula (7)

[Chem. 8]

[Chem. 9]

Chemical Formula (8)

Chemical Formula (9)

[Chem. 10]

Chemical Formula (10)

Further, the linking group that contains a six-membered ring is not limited to the above-described chemical formulae (3) to (10), and may be any as long as the linking group contains carbon and hydrogen and is adsorbed to a metal atom on the surface of the metal foil.

In the following embodiments, a description will be made by dividing an embodiment into a plurality of sections or embodiments for the sake of convenience, if necessary. However, unless otherwise explicitly specified, those sections or embodiments are not unrelated to each other, but are in such a relationship that one is a modification, a detailed or supplementary description, etc. of a part or the whole of the other.

Further, in the following embodiments, when a reference is made to the number, etc. (including the number, numeric value, quantity, range, etc.) of elements, unless otherwise explicitly specified, and unless obviously limited to a specific number in principle, etc., the number is not limited to the specific number but may be greater or less than the specific number.

Still further, in the following embodiments, it is needless to say that the constituent elements (including constituent steps, etc.) are not necessarily essential, unless otherwise explicitly specified, and unless obviously considered to be essential in principle, etc.

Similarly, in the following embodiments, when a reference is made to the shape, positional relationship, etc. of a constituent element or the like, they are construed as including those substantially close or similar to the shape, etc., unless otherwise explicitly specified, and unless obviously considered otherwise in principle, etc. The same shall apply to the numeric value and range described above.

Further, in all the drawings for illustrating the embodiments, the same members are denoted by the same reference signs, and the repeated description thereof is omitted.

Hereinafter, Examples will be described in detail with reference to drawings.

EXAMPLES

Figure 1:
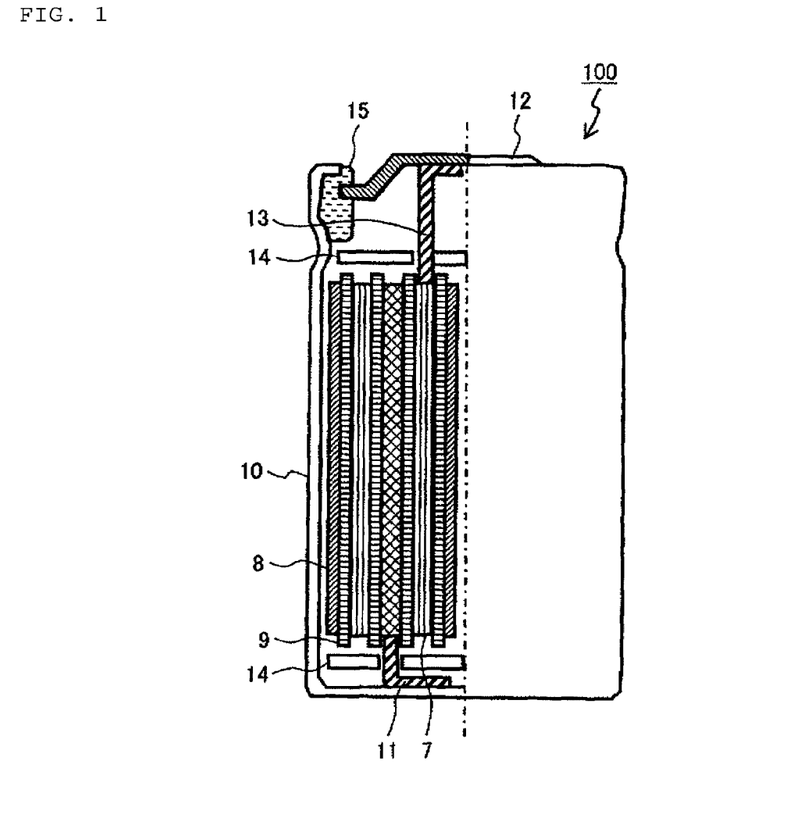
FIG. 1 is a partial cross-sectional diagram showing a lithium ion battery of Example.

FIG. 1 is a partial cross-sectional diagram showing a cylindrical lithium ion battery.

In this drawing, a cathode plate 7 (positive electrode) and an anode plate 8 (negative electrode) have been wound cylindrically in such a state that a separator 9 is interposed therebetween so that these plates are not in direct contact with each other, whereby an electrode group is formed. To the cathode plate 7, a cathode plate lead piece 13 has been attached, and to the anode plate 8, an anode plate lead piece 11 has been attached.

The electrode group has been inserted into a battery can 10 (made of, for example, stainless steel (SUS)), and constitutes a battery 100 as a whole.

An insulating plate 14 has been disposed at the top and the bottom of the battery can 10, so that the electrode group is not in direct contact with the battery can 10. In the battery can 10, an electrolytic solution has been injected.

The battery can 10 is hermetically sealed in a state of being insulated from a sealing lid 12 through a packing 15.

Figure 2:
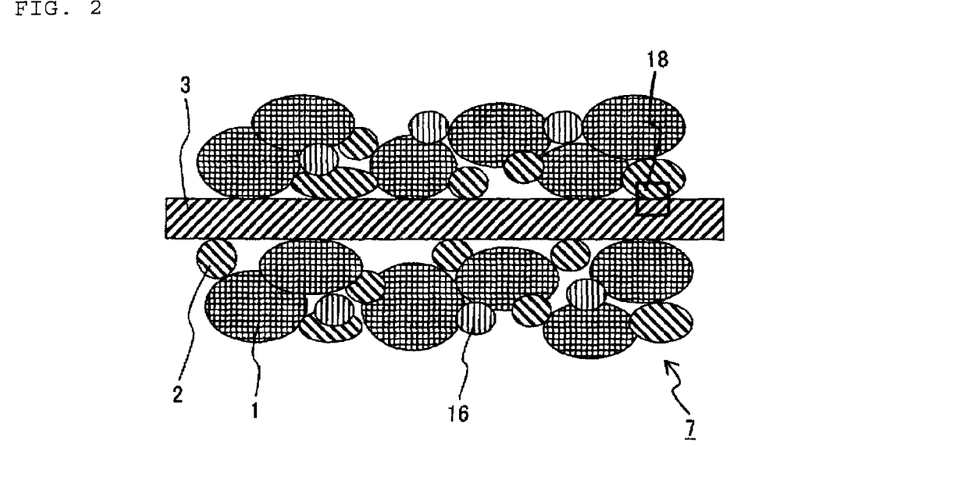
FIG. 2 is a schematic cross-sectional diagram showing a cathode plate of the lithium ion battery of Example.

FIG. 2 is an enlarged schematic cross-sectional diagram showing a portion of the cathode plate.

Figure 3:
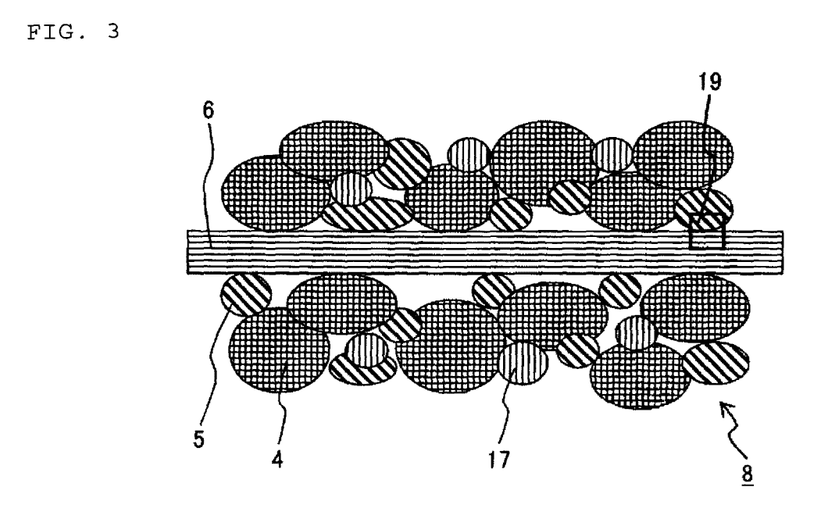
FIG. 3 is a schematic cross-sectional diagram showing an anode plate of the lithium ion battery of Example.

FIG. 3 is an enlarged schematic cross-sectional diagram showing a portion of the anode plate.

In FIG. 2, the cathode plate 7 is one produced by applying a cathode mixed material containing a cathode active material 1, a cathode binder 2, and an electrically conductive material 16 to a cathode metal foil 3. Here, at an interface 18 where the cathode binder 2 and the cathode metal foil 3 are in contact with each other, an end group of the cathode binder 2 and a metal atom constituting the cathode metal foil 3 are chemically bonded to each other.

In FIG. 3, the anode plate 8 is one produced by applying an anode mixed material containing an anode active material 4, an anode binder 5, and an electrically conductive material 17 to an anode metal foil 6. Here, at an interface 19 where the anode binder 5 and the anode metal foil 6 are in contact with each other, an end group of the anode binder 5 and a metal atom constituting the anode metal foil 6 are chemically bonded to each other.

Next, a production procedure for the battery 100 will be described.

First, a cathode plate 7 that contains a cathode active material 1, a cathode binder 2, and a cathode metal foil 3, and an anode plate 8 that contains an anode active material 4, an anode binder 5, and an anode metal foil 6 were produced, and a separator 9 was interposed between the cathode plate 7 and the anode plate 8 so as to prevent these plates from being in direct contact with each other. Then, an electrode group was produced by winding these plates. At this time, a cathode plate lead piece 13 and an anode plate lead piece 11 were disposed on end faces of the electrode group on the sides opposite to each other. Further, in the arrangement for the cathode plate 7 and the anode plate 8, a region where a mixed material for the cathode plate 7 was applied did not extend beyond a region where a mixed material for the anode plate 8 was applied. Further, as the separator 9, a finely porous polypropylene film was used.

Subsequently, the electrode group was inserted into a battery can 10, and the anode plate lead piece 11 was welded to the bottom of the battery can 10, and the cathode plate lead piece 13 was welded to a sealing lid 12 which also functions as a cathode current terminal. After a non-aqueous electrolytic solution (for example, a solution obtained by dissolving $LiPF_6$ in a mixed solvent of ethylene carbonate (EC) and dimethyl carbonate (DMC)) was injected into the battery can 10 in which the electrode group was arranged, the battery can 10 was hermetically sealed by caulking the sealing lid 12 fitted with a packing 15 to the battery can 10, whereby a cylindrical battery was formed. Here, the sealing lid 12 was provided with a cleavage valve which cleaves when a pressure in the battery 100 increases to release the internal pressure of the battery. Between the sealing lid 12 and the electrode group, an insulating plate 14 was provided.

In this Example, in order to improve, as compared with the conventional ones, the adhesion strength at an interface between the binder resin (the cathode binder 2 or the anode binder 5) and the metal foil (the cathode metal foil 3 or the anode metal foil 6) as represented by a portion denoted by a reference sign 18 in FIG. 2 and a portion denoted by a reference sign 19 in FIG. 3, a configuration in which a chemical bond is formed between the binder resin and the metal foil is adopted. Conventionally, polyvinylidene fluoride (PVDF) which is highly resistant to an electrolytic solution has been used as the binder resin, however, in order to form a chemical bond with a metal, it is preferred that the binder resin has a six-membered ring such as a cyclohexane ring or a benzene ring.

Accordingly, in this Example, as the binder resin, one that has a six-membered ring such as a cyclohexane ring or a benzene ring at both ends of a polyvinylidene fluoride molecular chain was used.

Figure 4:
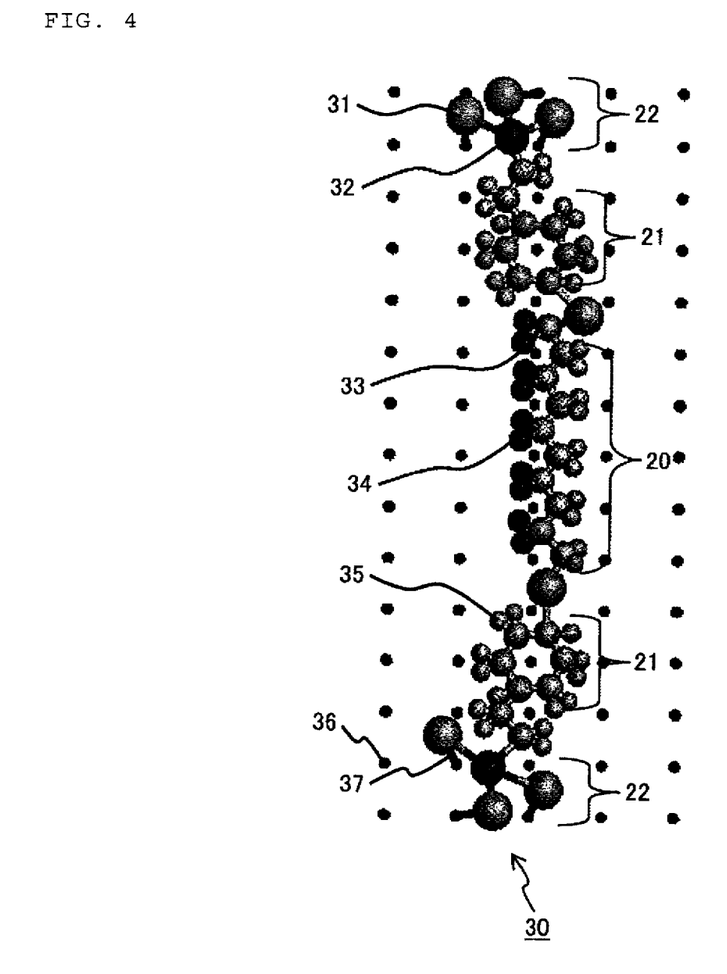
FIG. 4 is a schematic diagram showing a molecular structure at an interface between a metal foil and a binder resin that constitute an electrode for the lithium ion battery of Example.
Figure 5:
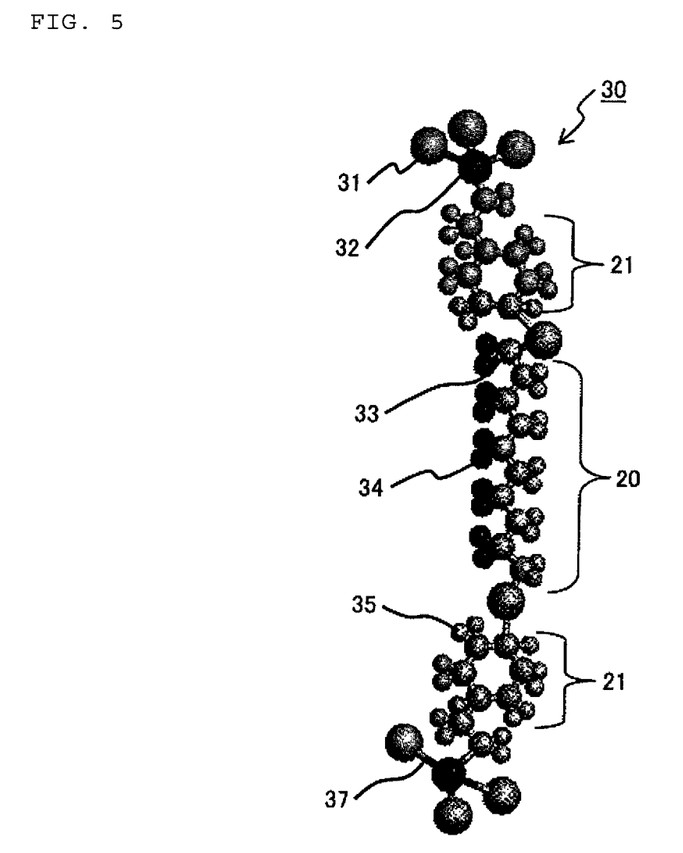
FIG. 5 is a schematic diagram showing a molecular structure of the binder resin on the surface of the metal foil.

FIG. 4 shows, as an example, a structure in which Cu foil (copper foil) in a negative electrode and a binder resin in which a cyclohexane ring is attached to both ends of a polyvinylidene fluoride molecular chain are chemically bonded to each other. FIG. 5 is a diagram in which the copper foil portion in FIG. 4 has been deleted.

FIGS. 4 and 5 are diagrams of the interface between the binder resin 30 and the copper foil as viewed in the direction perpendicular to the interface, and the diagrams are displayed with balls which represent atoms and sticks 37 which represent chemical bonds. That is, the diagrams are molecular models (ball-and-stick models).

In these drawings, the balls represent (in descending order of diameter) an oxygen atom 31, a silicon atom 32, a carbon atom 33, a fluorine atom 34, a hydrogen atom 35, and a copper atom 36.

In FIG. 4, the binder resin 30 contains a polyvinylidene fluoride molecular chain 20, a cyclohexane ring 21 attached to both ends of the polyvinylidene fluoride molecular chain 20, and —$SiO_3$ attached to the cyclohexane ring 21 through —$CH_2CH_2$—. Here, —$SiO_3$ constitutes an end group 22.

In FIGS. 4 and 5, a state in which the binder resin 30 is chemically bonded to the metal foil is shown, and therefore, the binder resin 30 has a chemical structure represented by —$SiO_3$, however, the binder resin 30 before being bonded to the metal foil has an end group represented by $SiX_3$ (wherein X is a functional group that undergoes a condensation reaction).

With regard to a copper atom 36 (Cu) on the surface of copper foil, only one atom layer is shown in FIG. 4, however, in fact, there exist a plurality of Cu layers. In addition, in FIG. 4, only a single polyvinylidene fluoride molecular chain 20 is shown, however, in fact, there exist a plurality of such structures.

If the binder resin 30 is composed only of polyvinylidene fluoride, the binder resin 30 does not form a chemical bond with the copper atom 36 and floats above the surface of the copper foil.

On the other hand, since the binder resin 30 shown in this Example includes the cyclohexane ring 21 attached to both ends of the polyvinylidene fluoride molecular chain 20, the cyclohexane ring 21 is adsorbed onto the surface of the copper foil and fixed thereto. Due to this, —$SiX_3$ constituting the end group of the binder resin 30 and the copper atom 36 come close to each other to increase the frequency of collision therebetween, thereby facilitating the formation of a chemical bond.

The cyclohexane ring 21 has a shape such that one copper atom 36 fits into the center thereof, and therefore, the adsorption is strong, and a structure with high integrity can be obtained.

FIG. 4 shows Example using a silane coupling agent.

The silane coupling agent has —$SiX_3$ as the end group. Here, as X, $OCH_3$, $OC_2H_5$, $OCOCH_3$, Cl, or the like is generally used. These are functional groups that undergo a condensation reaction and are degraded under an appropriate condition to bond a silicon atom 32 (Si) to a copper atom 36 (Cu) through an oxygen atom 31.

The chemical formula of the binder resin 30 shown in this drawing can be represented by $SiO_3$ $(CH_2)_2C_6H_{10}O$ $(CF_2CH_2)_5OC_6H_{10}(CH_2)_2SiO_3$ in a state where the binder resin 30 is bonded to the copper foil (metal foil).

Further, the general formula of this binder resin 30 can be represented by $SiO_3(CH_2)_{m1}O_6H_{10}O(CF_2CH_2)_{n1}OC_6H_{10}(CH_2)_{m2}SiO_3$ (wherein m1, m2, and n1 are each a positive integer) in a state where the binder resin 30 is bonded to the copper foil (metal foil).

In fact, as described next, the chemical bond is formed by undergoing a production process such as an alkali treatment of the Cu surface, the addition of a coupling agent, and a thermal treatment.

First of all, a production process for the anode plate (negative electrode) will be described.

Figure 6:
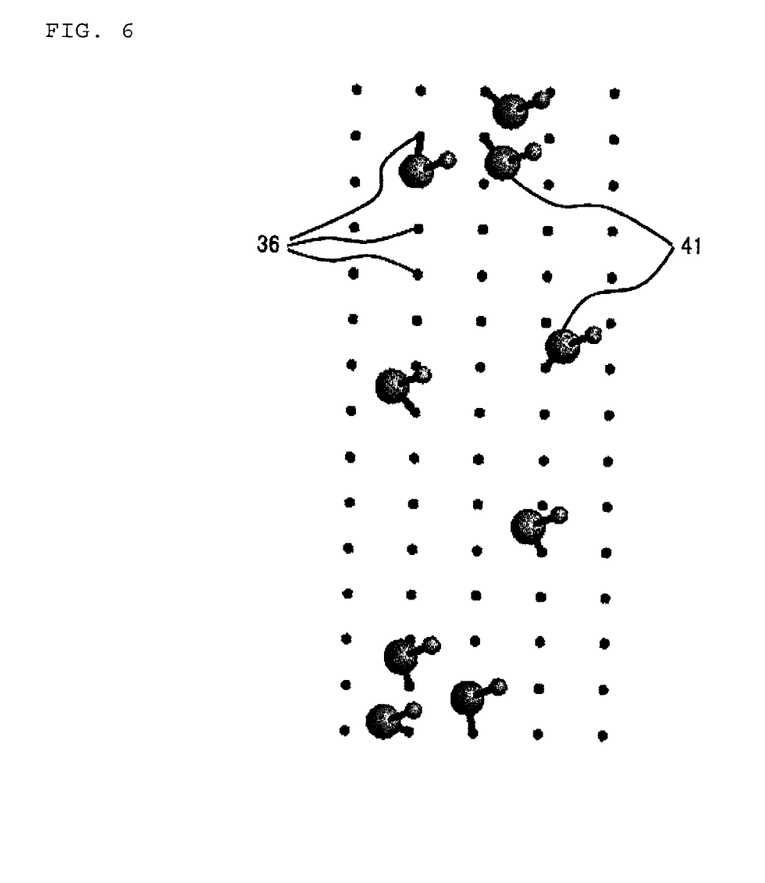
FIG. 6 is a schematic diagram showing a molecular structure of the surface of the metal foil to which an OH group is attached by an alkali treatment.

First, the surface of the copper foil is treated with an alkali, whereby an OH group 41 (a hydroxy group) is attached to a copper atom 36 (FIG. 6).

Subsequently, to an anode active material, for example, an anode active material (denoted by a reference sign 4 in FIG. 3) composed of an amorphous carbon material, an electrically conductive material (denoted by a reference sign 17 in FIG. 3) such as acetylene black or carbon fiber is added, and both components are mixed with each other. Then, as a binder, a coupling agent which has a polyvinylidene fluoride molecular chain and a six-membered ring and is dissolved in N-methyl-2-pyrrolidinone (NMP) is added thereto, and the resulting mixture is kneaded, whereby an anode slurry is obtained.

Subsequently, this anode slurry is applied to the surface of the copper foil treated with an alkali, followed by heating and drying, whereby an anode plate is obtained. As the coupling agent, for example, 2-(3,4-epoxycyclohexyl)ethyltrimethoxysilane manufactured by Dow Corning Toray Co., Ltd. is used.

Figure 7:
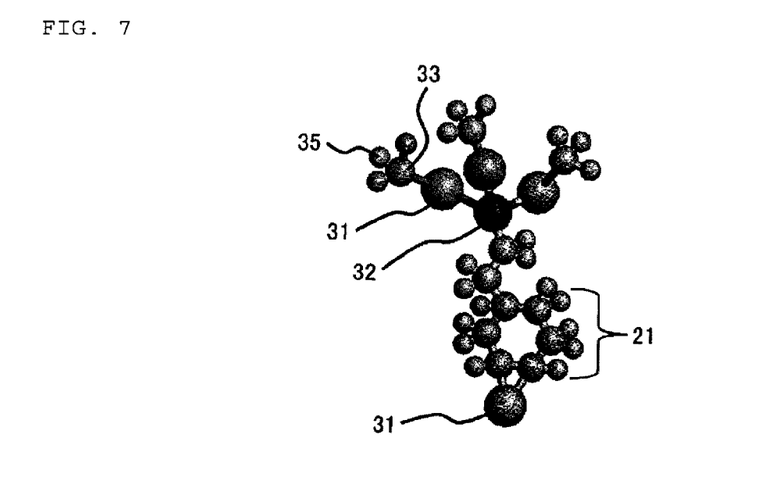
FIG. 7 is a schematic diagram showing an example of a molecular structure of a silane coupling agent having a cyclohexane ring.

The molecular model of this coupling agent is as shown in FIG. 7.

The coupling agent shown in this drawing has a structure in which an epoxidized cyclohexane ring 21 is attached to trimethoxysilane through an ethyl group. A moiety of the epoxidized cyclohexane ring 21 is reacted with polyvinylidene fluoride and is bonded thereto, whereby a starting material of the anode slurry is prepared. When the epoxy group of the cyclohexane ring 21 is heated on a metal foil in a state of being present in the vicinity of the polyvinylidene fluoride molecular chain, the epoxy group undergoes ring opening and two dangling bonds are formed. One of the dangling bonds reacts with the polyvinylidene fluoride molecular chain and is bonded thereto. The other dangling bond is terminated with hydrogen.

Next, a production process for the cathode plate (positive electrode) will be described.

First, the surface of the copper foil is treated with an alkali, whereby an OH group 41 is attached to a copper atom 36 (FIG. 6). This process is the same as in the case of the anode plate.

Subsequently, to a cathode active material (denoted by a reference sign 1 in FIG. 2) composed of, for example, lithium manganate, lithium cobaltate, lithium nickelate, or the like as a main constituent material, an electrically conductive material (denoted by a reference sign 16 in FIG. 2) such as graphite, acetylene black, or carbon black is added, and both components are mixed with each other. Then, as a binder, a coupling agent which has a polyvinylidene fluoride molecular chain and a six-membered ring and is dissolved in N-methyl-2-pyrrolidinone (NMP) is added thereto, and the resulting mixture is kneaded, whereby a cathode slurry is obtained.

Subsequently, this cathode slurry is applied to the surface of the copper foil treated with an alkali, followed by heating and drying, whereby an anode plate is obtained. As the coupling agent, in the same manner as the case of the negative electrode, 2-(3,4-epoxycyclohexyl)ethyltrimethoxysilane manufactured by Dow Corning Toray Co., Ltd. can be used.

In the above-described Example, if sufficient corrosion resistance cannot be obtained with copper foil, aluminum foil can be used. In this case, it is preferred to use a benzene ring to a cyclohexane ring as the six-membered ring from the viewpoint of adhesiveness. In particular, in the case of a positive electrode, a combination of aluminum foil with a benzene ring is preferred from the viewpoint of corrosion resistance.

Further, in the above-described Example, as shown in FIG. 4, the length of the polyvinylidene fluoride molecular chain 20 corresponded to the length of 10 carbon atoms.

Figure 8:
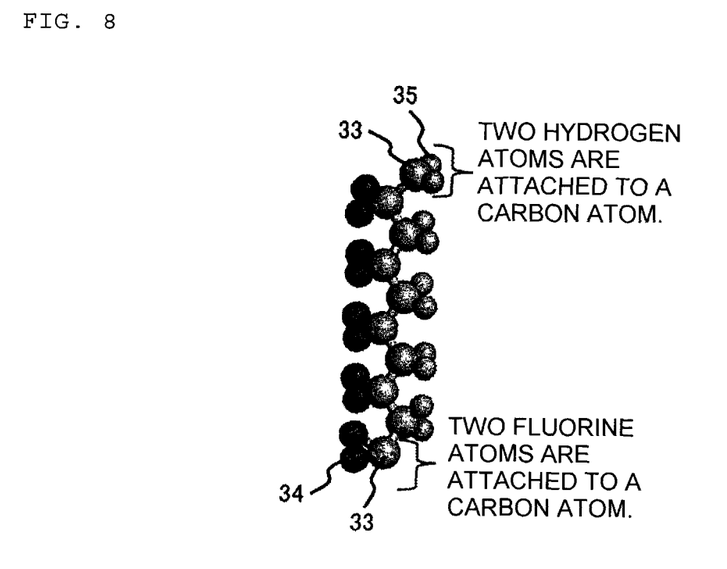
FIG. 8 is a schematic diagram showing a fragment of a polyvinylidene fluoride molecular chain.

FIG. 8 is a diagram showing only a moiety of the polyvinylidene fluoride molecular chain 20.

Figure 9:
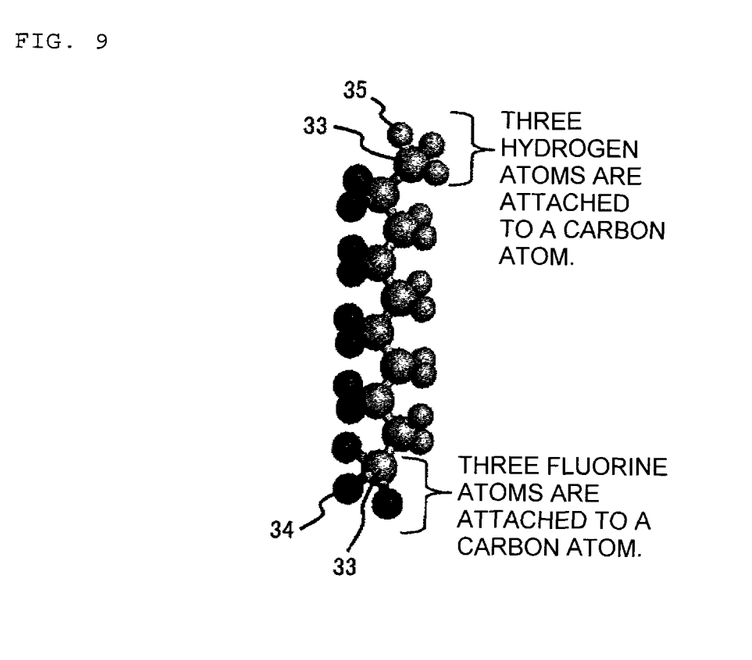
FIG. 9 is a schematic diagram showing a fragment in which a hydrogen atom is attached to an end of polyvinylidene fluoride.

Both ends of the polyvinylidene fluoride molecular chain 20 in this drawing have a structure in which two fluorine atoms 34 or two hydrogen atoms 35 are attached to the carbon atom 33, however, at a stage before the coupling agent is mixed, as shown in FIG. 9, a structure in which three fluorine atoms 34 or three hydrogen atoms 35 are attached to the carbon atom 33 may be used.

Figure 10:
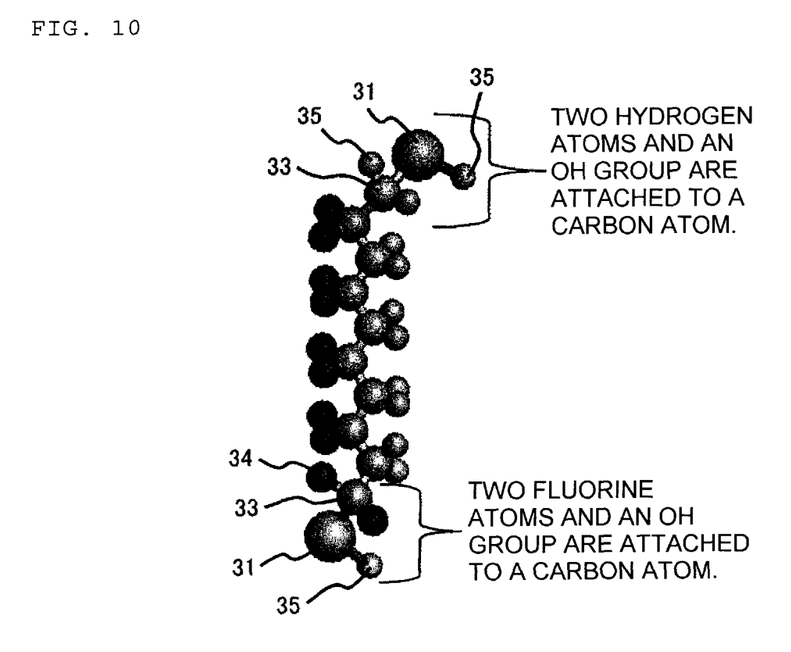
FIG. 10 is a schematic diagram showing a fragment in which a hydroxy group is attached to an end of polyvinylidene fluoride.

Further, as shown in FIG. 10, a structure in which two fluorine atoms 34 and an OH group are attached to the carbon atom 33, or a structure in which two hydrogen atoms 35 and an OH group are attached to the carbon atom 33 may be used. The length of the molecular chain is not limited to the length of 10 carbon atoms, and may be longer or shorter than the length of 10 carbon atoms.

FIGS. 11 to 14 are graphs quantitatively showing an effect of improving the adhesiveness. In the drawings, the adhesiveness is expressed as peeling energy indicated on the vertical axis.

Figure 11:
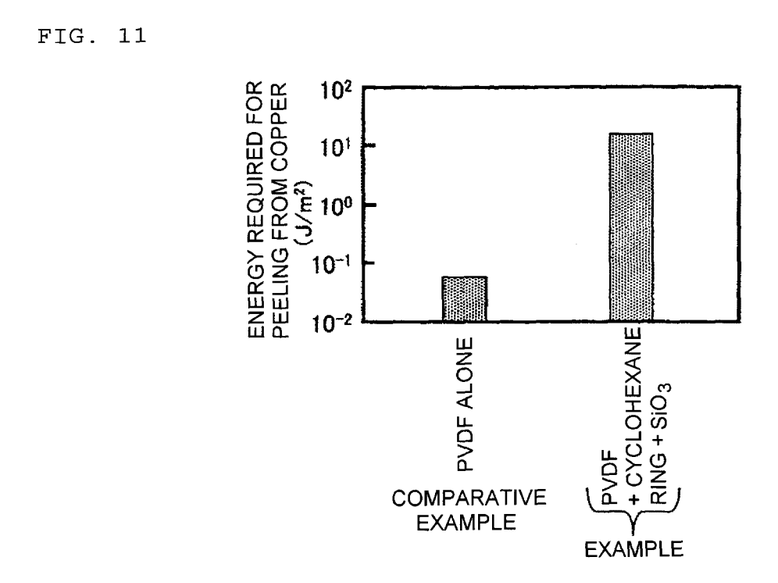
FIG. 11 is a graph showing an effect of improving adhesiveness when a binder resin having a molecular structure in which a cyclohexane ring and $SiO_3$ are attached to a polyvinylidene fluoride molecular chain is adhered to copper foil.

FIG. 11 is a graph showing the results of the above-described Example and Comparative Example using PVDF alone side by side.

It is found that in the case where the cyclohexane ring is contained and the copper atom and —$SiO_3$ are chemically bonded to each other as in Example, the adhesion strength is improved by a double digit or more as compared with the case where PVDF and Cu are bonded to each other without forming a chemical bond as in Comparative Example.

Figure 12:
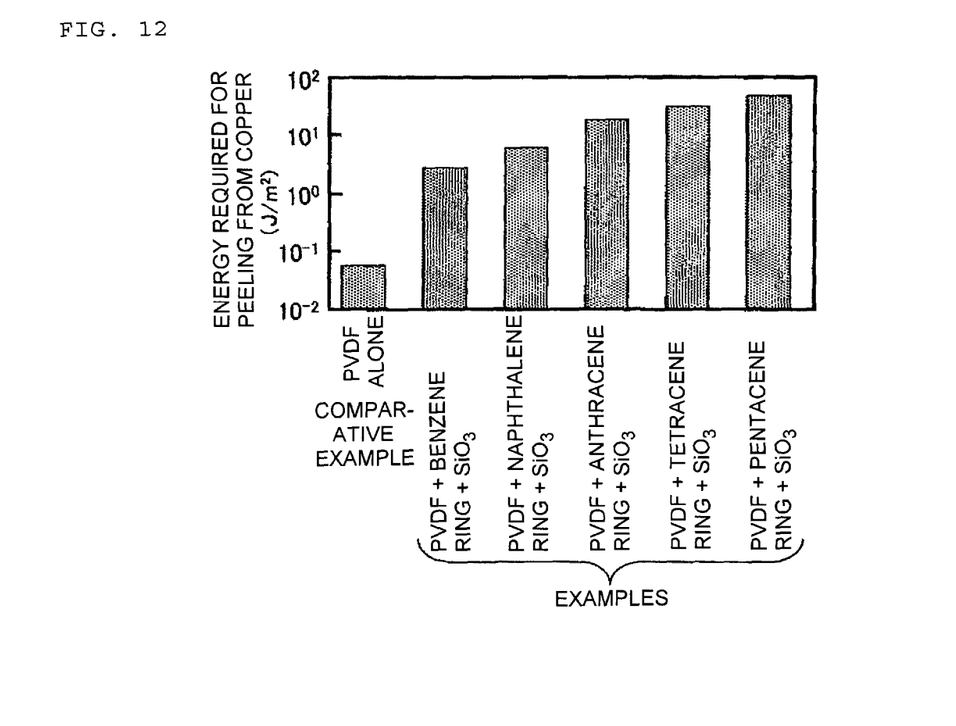
FIG. 12 is a graph showing an effect of improving adhesiveness when a binder resin having a molecular structure in which an acene ring and $SiO_3$ are attached to a polyvinylidene fluoride molecular chain is adhered to copper foil.

FIG. 12 is a graph showing the results of Examples using a benzene ring, a naphthalene ring (in which two benzene rings are fused), an anthracene ring (in which three benzene rings are fused), a tetracene ring (in which four benzene rings are fused), or a pentacene ring (in which five benzene rings are fused) in place of a cyclohexane ring.

Also in the case of the Examples shown in this drawing, the adhesion strength is improved by a single digit or more as compared with the case of Comparative Example using PVDF alone.

Figure 13:
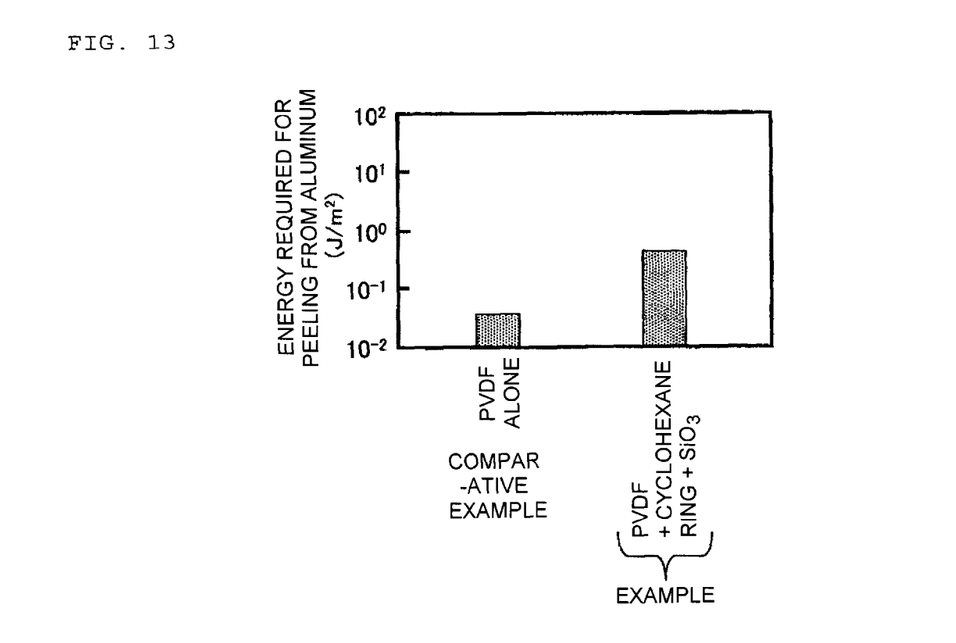
FIG. 13 is a graph showing an effect of improving adhesiveness when a binder resin having a molecular structure in which a cyclohexane ring and $SiO_3$ are attached to a polyvinylidene fluoride molecular chain is adhered to aluminum foil.
Figure 14:
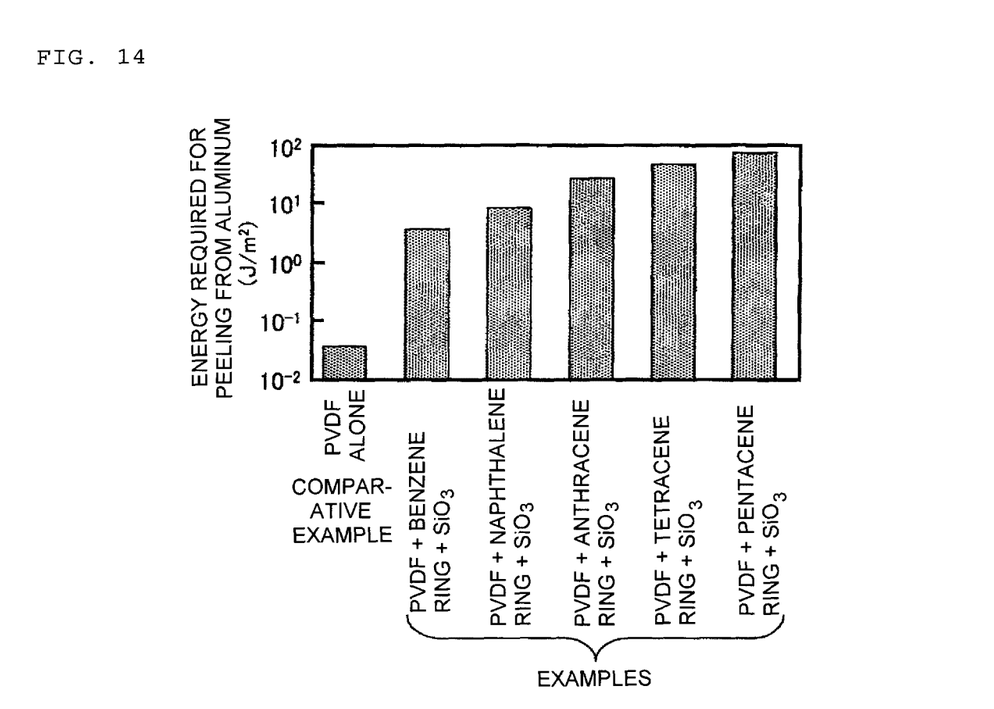
FIG. 14 is a graph showing an effect of improving adhesiveness when a binder resin having a molecular structure in which an acene ring and $SiO_3$ are attached to a polyvinylidene fluoride molecular chain is adhered to aluminum foil.

The results obtained in the case of using aluminum foil in place of copper foil are shown in FIGS. 13 and 14.

From these drawings, it can be concluded that in the case of using aluminum foil, although an effect can be obtained even in the case of using a cyclohexane ring, the cases where a benzene ring, a naphthalene ring (in which two benzene rings are fused), an anthracene ring (in which three benzene rings are fused), a tetracene ring (in which four benzene rings are fused), or a pentacene ring (in which five benzene rings are fused) is used show a larger difference from the result of Comparative Example as compared with the case when a cyclohexane ring is used, and therefore are more preferred.

Incidentally, the same effect can be obtained even in the case where a metal atom constituting a metal foil is chemically bonded through any one of S, N, $GeO_3$, and $TiO_3$ other than the case where the metal atom is chemically bonded through $SiO_3$.

The reaction in the case of $GeO_3$ or $TiO_3$ is the same as in the case of $SiO_3$. In the case of a silane coupling agent, the silane coupling agent has —$SiX_3$ as the end group, however, in the case of S or N, a coupling agent having —SH or —$NH_2$ as the end group is used. That is, for example, a coupling agent having a structure in which the —$Si(OCH_3)_3$ moiety in FIG. 7 is replaced with —SH or —$NH_2$ may be used. Also in this case, when the epoxy group in the epoxidized moiety is heated on a metal foil in a state of being present in the vicinity of the polyvinylidene fluoride molecular chain, the epoxy group undergoes ring opening and reacts with the polyvinylidene fluoride molecular chain and is bonded thereto. Then, by heating the coupling agent on the metal foil, one hydrogen atom in —SH or —$NH_2$ is detached to form a dangling bond and the dangling bond is bonded to the metal.

Further, although not shown in the drawing, in the case of copper foil, by incorporating Si or Ni therein, the adhesion strength can be improved.

On the other hand, in the case of aluminum foil, by adopting a configuration in which Cu is contained in an amount of from 0.2 to 1.4 at. %, the adhesion strength can be improved by about 25%. Further, in the case of aluminum foil, by adopting a configuration in which Cr is contained in an amount of from 0.1 to 1.2 at. %, the adhesion strength can be improved by about 25%. Still further, in the case of aluminum foil, by adopting a configuration in which Ni is contained in an amount of from 0.2 to 1.6 at. %, the adhesion strength can be improved by about 30%.

The six-membered ring in the binder resin has a property of being easily adsorbed to a metal atom on the surface of the metal foil.

As described above, in the case where the main component of the metal foil is Cu, when Si or Ni is added as an additive element, the two six-membered rings positioned at both ends of the polyvinylidene fluoride molecular chain constituting the binder resin can capture and adsorb the metal atom on the surface of the metal foil at the center thereof. That is, the correspondence between the distance between the two metal atoms (which may be distantly positioned as shown in FIG. 4) in a metal crystal lattice constituting the metal foil and the distance between the two six-membered rings constituting one molecule of the binder resin becomes appropriate. Due to this, the molecule of the binder resin is fixed at two points by the adsorption of the six-membered rings, and a chemical reaction (coupling reaction) between the end groups of the binder resin and the metal atoms on the surface of the metal foil is promoted. In addition, even after the binder resin and the metal foil are chemically bonded to each other by this chemical reaction, a larger adhesion force is obtained in the case where the six-membered ring is adsorbed to the metal atom than otherwise.

In the case where the main component of the metal foil is Al, this effect is obtained by adding Cu, Cr, or Ni as an additive element as described above.

According to the invention, a method for producing a lithium ion battery with high production yield can be provided.

Further, according to the invention, a lithium ion battery having a positive electrode and a negative electrode, each of which does not cause peeling, can be provided.

INDUSTRIAL APPLICABILITY

The invention can be widely used not only for consumer batteries, but also for lithium ion batteries required to have a long service life such as batteries for electric cars, hybrid cars, and industrial tools.

REFERENCE SINGS LIST

1: cathode active material, 2: cathode binder, 3: cathode metal foil, 4: anode active material, 5: anode binder, 6: anode metal foil, 7: cathode plate, 8: anode plate, 9: separator, 10: battery can, 11: anode plate lead piece, 12: sealing lid, 13: cathode plate lead piece, 14: insulating plate, 15: packing, 16, 17: electrically conductive material, 18, 19: interface, 20: polyvinylidene fluoride molecular chain, 21: cyclohexane ring, 30: binder resin, 31: oxygen atom, 32: silicon atom, 33: carbon atom, 34: fluorine atom, 35: hydrogen atom, 36: copper atom, 37: stick, 41: OH group, 100: battery

The invention claimed is:

1. A binder resin, which is a compound having a chemical structure that contains a polyvinylidene fluoride molecular chain, a six-membered ring containing carbon and hydrogen, and an end group selected from the group consisting of $SiX_3$, $SH$, $NH_2$, $GeX_3$, and $TiX_3$, wherein X is a functional group that undergoes a condensation reaction, wherein the six-membered ring is disposed in a region between the polyvinylidene fluoride molecular chain and the end group; the binder resin being represented by chemical formula wherein $Y^1$ and $Y^2$ may be the same or different and are each selected from the group consisting of $SiX_3$, $SH$, $NH_2$, $GeX_3$, and $TiX_3$, wherein X is a functional group that undergoes a condensation reaction; $R^1$ and $R^4$ are each a linear alkyl group having 2 to 4 carbon atoms to which a fluorine atom may be attached; $R^2$ and $R^3$ are each a linking group that contains a six-membered ring containing carbon and hydrogen; and n is a positive integer of at least 2.

2. The binder resin according to claim 1, wherein the X is a functional group selected from the group consisting of $OCH_3$, $OC_2H_5$, $OCOCH_3$, and Cl.

3. The binder resin according to claim 1, wherein the six-membered ring is a benzene ring or a cyclohexane ring.

4. The binder resin according to claim 1, wherein the $R^2$ and $R^3$ each contain an acene ring.

5. The binder resin according to claim 4, wherein the acene ring is a naphthalene ring, an anthracene ring, a tetra ring, or a pentacene ring.

6. A method for producing a lithium ion battery, which is a method for producing a lithium ion battery containing a positive electrode and a negative electrode, each having a configuration in which a mixture containing the binder resin according to claim 1 and an active material is applied to a metal foil, and that the positive electrode and the negative electrode are produced by applying the binder resin to the metal foil to cause a coupling reaction between the binder resin and metal atoms constituting the surface of the metal foil.

7. The method for producing a lithium ion battery according to claim 6, wherein the coupling reaction is caused by a thermal treatment.

8. The method for producing a lithium ion battery according to claim 6, wherein the coupling reaction is a silane coupling reaction or a thiol coupling reaction.

* * * * *